May 10, 1932.  W. H. ODLUM ET AL  1,857,211

WHEEL PULLER

Filed Feb. 27, 1931

Inventors:
William H. Odlum
Edward Henry Peterson
By Williams, Bradbury,
McCaleb & Hinkle.
Attys.

Patented May 10, 1932

1,857,211

UNITED STATES PATENT OFFICE

WILLIAM H. ODLUM AND EDWARD HENRY PETERSON, OF CHICAGO, ILLINOIS, ASSIGNORS TO DURO METAL PRODUCTS COMPANY, OF CHICAGO, ILLINOIS, A CORPORATION OF ILLINOIS

WHEEL PULLER

Application filed February 27, 1931. Serial No. 513,721.

This invention relates to wheel pullers suitable for use in removing automobile wheels from the axle shafts on which they are mounted, and similar purposes.

One of the objects of the invention is to provide an improved wheel puller.

A further object of the invention is to provide a wheel puller which is adapted to apply an even pull around the circumference of the part of the wheel upon which it acts.

A further object of the invention is to provide a wheel puller which may be easily and expeditiously attached to the wheel.

A further object of the invention is to provide a wheel puller which is adapted to engage the wheel hub and the axle shaft to insure correct alignment, and which may be readily applied thereto.

A further object of the invention is to provide a wheel puller which is particularly adapted for use in removing automobile wheels whose hubs are provided with a radially projecting bead or ring.

Figure 1:
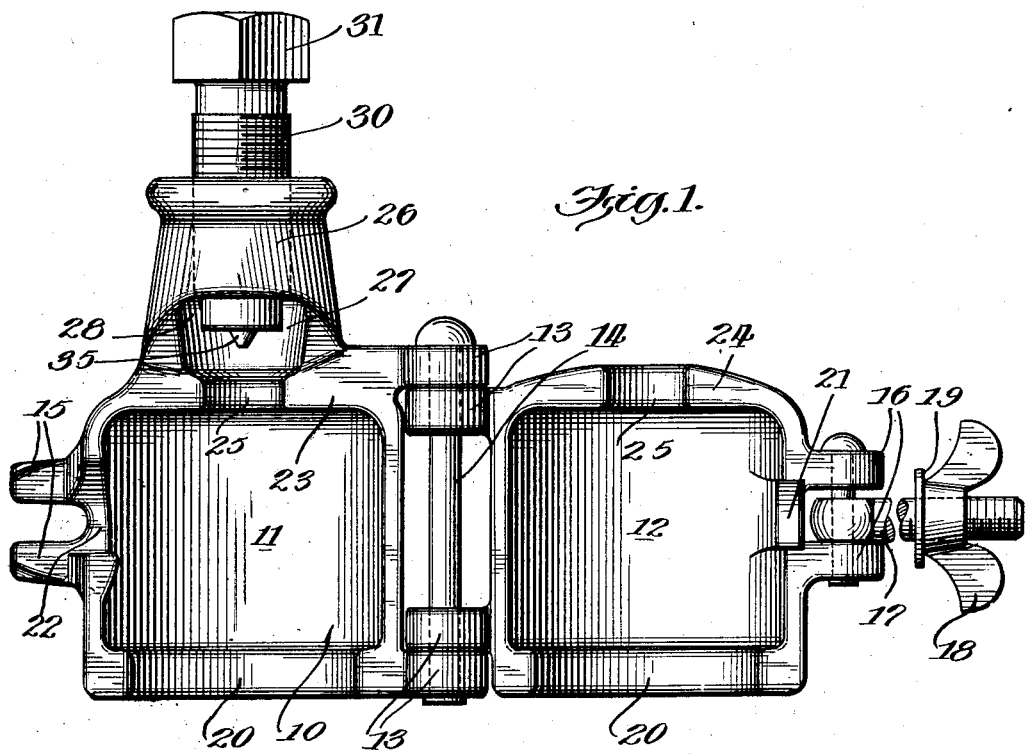
Figure 2:
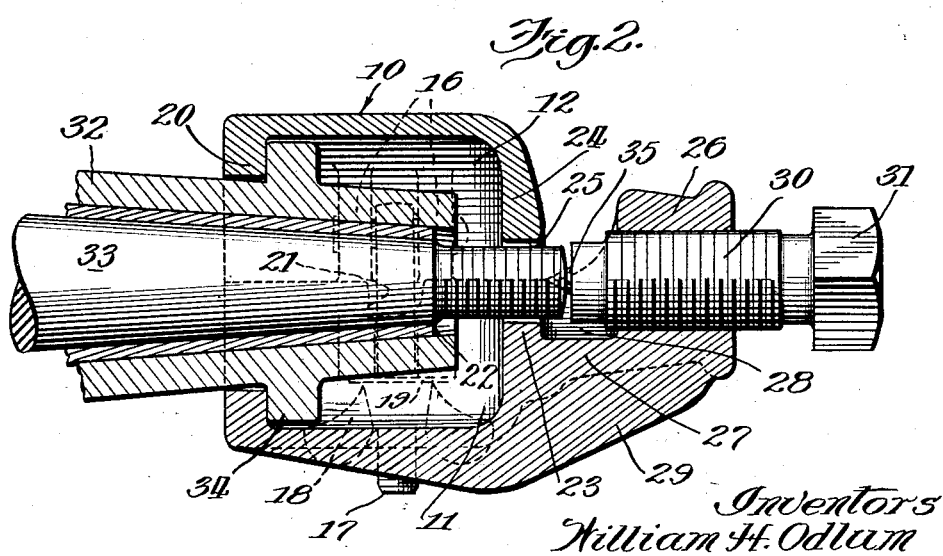

Other objects, advantages and capabilities of the invention will readily appear from the following description of the preferred embodiment, taken in conjunction with the accompanying drawings in which Figure 1 is an elevational view of the wheel puller in open condition; and Fig. 2 is a sectional view through the wheel puller in operative position.

Referring to the drawings, the wheel puller comprises a substantially cup shaped housing 10 which is constituted by two similar elements 11 and 12, which are suitably hinged together, for example by lugs 13, integrally carried by the elements at adjacent longitudinal edges, and a pin 14 which extends through openings therein.

Adjacent their other longitudinal edges the elements 11 and 12 are provided with lugs 15 and 16 respectively. A bolt 17 is pivotally mounted in the lugs 16 so that it may be swung into position between the lugs 15 when the elements 11 and 12 are closed. A wing nut 18 and washer 19 mounted on the bolt 17 enable the elements of the housing 10 to be readily secured together in operative relation.

At the outer end of the cup shaped housing 10, the elements 11 and 12 are provided with an inwardly directed flange or bead 20. The longitudinal edges of the elements 11 and 12 which are brought into contact when the housing is closed, are provided with intermeshing means which maintain the elements in cooperating relation and communicate thrust from one to the other. Thus element 12 is provided with a detent 21, while the element 11 is provided with a corresponding recess 22. The edges of the detent and recesses adjacent the open end of the housing 10 are in the circumferential direction so that thrust may be communicated from the element 11 to the element 12 without a circumferential component. The edges of the detent 21 and recess 22 remote from the open end of the housing are preferably oblique or curved so as to assist in bringing the elements 11 and 12 into relation when the housing is closed.

The elements 11 and 12 of the housing 10 carry integral end walls 23 and 24 respectively which form the bottom or base of the cup shaped housing 10. These end walls are provided with registering recesses which provide an opening 25 in the base of the housing 10 when the same is closed.

The element 11 carries integrally a boss 26 which is internally threaded and is located in spaced relation to the opening 25, with which it is in alignment. The boss 26 is carried from the end wall 23 of the element 11 by means of a semi-cylindrical neck 27 which provides an open sided chamber 28. The boss 26 may be reinforced by means of a web 29 which extends rearwardly from the element 11, boss 26 and neck 27.

A bolt 30 is threadedly mounted in the boss 26, said bolt being provided at its outer end with a head 31 whereby it may be engaged by a suitable wrench and actuated so as to project its inner end into the chamber 28.

The improved wheel puller is particularly adapted for use with automobile wheels of known type in which the hub 32, which is rigidly mounted upon an axle shaft 33, is provided with a circumferential flange or bead 34 a short distance from the outer end of the hub. It will, however, be understood that it may be readily adapted to other types of wheels.

In use with such a wheel, the wheel puller is applied to the hub 32 so as to enclose the outer end thereof, thereby locating the flange 34 within the housing in abutment against the flange 20, and locating the outer end of the axle shaft 33 so that it extends through the opening 25 into the chamber 28. The housing 10 is now locked by means of a wing nut 18 and the bolt 30 is actuated so as to be moved inwardly and apply pressure to the end of the shaft 33. This actuation causes a pull to be applied upon the housing which is exerted through the flange 20 around the whole circumference of the flange 34. The engagement between the edges of the detent 21 and the recess 22, referred to above, communicates this pull from the element 11 to the element 12 so that this substantially uniform distribution of the pull is obtained.

If desired, the inner end of the bolt 30 may be provided with a conical point 35 which enters the center point in the end of the shaft and insures alignment between the shaft 33 and the bolt 30. Approximate alignment is obtained by the engagement of the shaft 33 with the sides of the opening 25 when the wheel puller is applied to the wheel.

Although the invention has been disclosed in connection with the specific details of preferred embodiments thereof, it must be understood that such details are not intended to be limitative of the invention, except insofar as set forth in the accompanying claims.

What we claim as new and desire to secure by Letters Patent is:

1. A wheel puller comprising a body portion which includes a housing element, a complementary housing element hinged thereto, said elements in closed condition providing a cup shaped housing, a flange at the mouth end of each of said housing elements adapted to engage an annulus on the hub of the wheel around its circumference, said elements at their ends opposite the mouth ends being provided with recesses which register to provide an axial opening adapted to receive the end of the axle shaft, and means carried by one of the housing elements for applying axial force to the axle shaft.

2. A wheel puller comprising two housing elements hinged together and adapted to be secured one to the other to form a cup shaped housing, an inwardly directed flange at the outer end of each element, each of said elements at its inner end being provided with a recess, said recesses being adapted to register to provide a central opening in the closed housing, a boss integral with one housing element, and in alignment with said opening, and a bolt threadedly mounted in said boss.

3. A wheel puller comprising two housing elements hinged together and adapted to be secured one to the other to form a cup shaped housing, an inwardly directed flange at the outer end of each element, the inner ends of said elements being provided with recesses which register to provide a central opening in the closed housing, a boss in alignment with said opening, a semi-cylindrical neck supporting same upon one housing element, a rib reinforcing said boss and neck, and a bolt threadedly mounted in said boss.

4. A wheel puller comprising a body portion which includes a housing element, a complementary housing element hinged thereto, said elements in closed condition providing a cup shaped housing, a flange at the mouth end of each of said housing elements adapted to engage an annulus on the hub of the wheel around its circumference, said elements at their ends opposite the mouth ends being provided with recesses which register to provide an axial opening adapted to receive the end of the axle shaft, interengaging means carried on the meeting unhinged edges of the housing elements, and means carried by one of the housing elements for applying axial force to the axle shaft.

In witness whereof, we hereunto subscribe our names this 24th day of February, 1931.

WILLIAM H. ODLUM.
EDWARD HENRY PETERSON.